(12) United States Patent
MacNeille et al.

(10) Patent No.: US 8,670,877 B2
(45) Date of Patent: Mar. 11, 2014

(54) METHOD AND APPARATUS FOR ANALYZING AND OPTIMIZING FUEL/ENERGY CONSUMPTION

(75) Inventors: Perry Robinson MacNeille, Lathrup Village, MI (US); Oleg Yurievitch Gusikhin, West Bloomfield, MI (US); David Allen Kowalski, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/405,505

(22) Filed: Feb. 27, 2012

(65) Prior Publication Data

US 2013/0226367 A1 Aug. 29, 2013

(51) Int. Cl.
*G05D 1/00* (2006.01)
*B60Q 1/00* (2006.01)

(52) U.S. Cl.
USPC .............................................. 701/1; 340/455

(58) Field of Classification Search
USPC ........................... 701/400–541; 340/988–996
See application file for complete search history.

(56) References Cited

U.S. PATENT DOCUMENTS

| 2007/0027593 | A1* | 2/2007 | Shah et al. | 701/30 |
| 2010/0102945 | A1* | 4/2010 | Watson et al. | 340/462 |
| 2012/0022904 | A1* | 1/2012 | Mason et al. | 705/7.13 |

FOREIGN PATENT DOCUMENTS

JP 2007-078368 * 3/2007

OTHER PUBLICATIONS

Ford Motor Company, "SYNC with Navigation System," Owner's Guide Supplement, SYNC System Version 1 (Jul. 2007).
Ford Motor Company, "SYNC," Owners's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem," Automotive Design & Production, Oct. 2003, http://findarticles.com, pp. 103.

* cited by examiner

*Primary Examiner* — Muhammad Shafi
(74) *Attorney, Agent, or Firm* — Jennifer M. Stec; Brooks Kushman P.C.

(57) ABSTRACT

A computer-implemented method includes receiving a request for improving vehicular energy conservation. The method further includes responsively providing at least one action to a vehicle computing system, based at least in part on received vehicle data. Also, the method includes receiving data relating to a change in vehicle energy efficiency resulting from implementation of the action. The method additionally includes analyzing the received data and action along with data resulting from similar actions to determine a generalized effect of the action.

17 Claims, 4 Drawing Sheets

METHOD AND APPARATUS FOR ANALYZING AND OPTIMIZING FUEL/ENERGY CONSUMPTION

TECHNICAL FIELD

The illustrative embodiments generally relate to methods and apparatuses for optimizing and analyzing fuel/energy consumption.

BACKGROUND

For a long time, running short on fuel has been a concern typically restricted to situations where a driver is distant from any gas stations, in what are normally remote areas. With the prevalence of refueling points available in most populated areas, as long as a driver shows even a modicum of caution with regards to a low fuel state, a vehicle should almost never run out of gas.

The introduction of battery electric vehicles (BEVs), however, has changed all that. First, BEVs take significantly more time than gas-powered vehicles to refuel. While a gas powered vehicle can often be fully refueled in less than five minutes, fully charging a BEV could take an hour or more. Accordingly, people will generally prefer to refuel the vehicle during "down time," such as when it is parked in a garage and not in use.

Additionally, there are not nearly as many electric "gas stations" as gasoline providing gas stations. In other words, if a person finds they are low on power in a BEV while underway, it is far more difficult to mitigate the situation. Short of pulling into someone's driveway and asking if they can recharge for a bit, there is little a person running critically low on power can do. Because of this, fear of running out of power is one of the number one concerns of the electric car owner.

Automotive manufacturers recognize this concern and the lack of recharging options, and accordingly they will often provide some form of range estimation. Based on a variety of factors, the range estimation will hopefully serve to offer a driver some indication of how far the vehicle can travel before the power runs out.

SUMMARY

In a first illustrative embodiment, a computer-implemented method includes receiving a request for improving vehicular energy conservation. The method further includes responsively providing at least one action to a vehicle computing system, based at least in part on received vehicle data. Also, the method includes receiving data relating to a change in vehicle energy efficiency resulting from implementation of the action. The method additionally includes analyzing the received data and action along with data resulting from similar actions to determine a generalized effect of the action.

In a second illustrative embodiment, a machine readable storage medium stores instructions that, when executed by a processor, cause the processor to perform the method including receiving a request for improving vehicular energy conservation. The method also includes responsively providing at least one action to a vehicle computing system, based at least in part on received vehicle data. Further, the method includes receiving data relating to a change in vehicle energy efficiency resulting from implementation of the action. Additionally, the method includes analyzing the received data and action along with data resulting from similar actions to determine a generalized effect of the action.

In a third illustrative embodiment, a computer-implemented method includes receiving a request for improving vehicular energy conservation. The method also includes receiving information identifying a driver and receiving vehicle data. Additionally, the method includes retrieving at least one action previously observed to be effective at energy conservation for the driver and stored with respect to a driver profile, based at least in part on received vehicle data and driver identity, and responsively providing the retrieved at least one action to a vehicle computing system.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
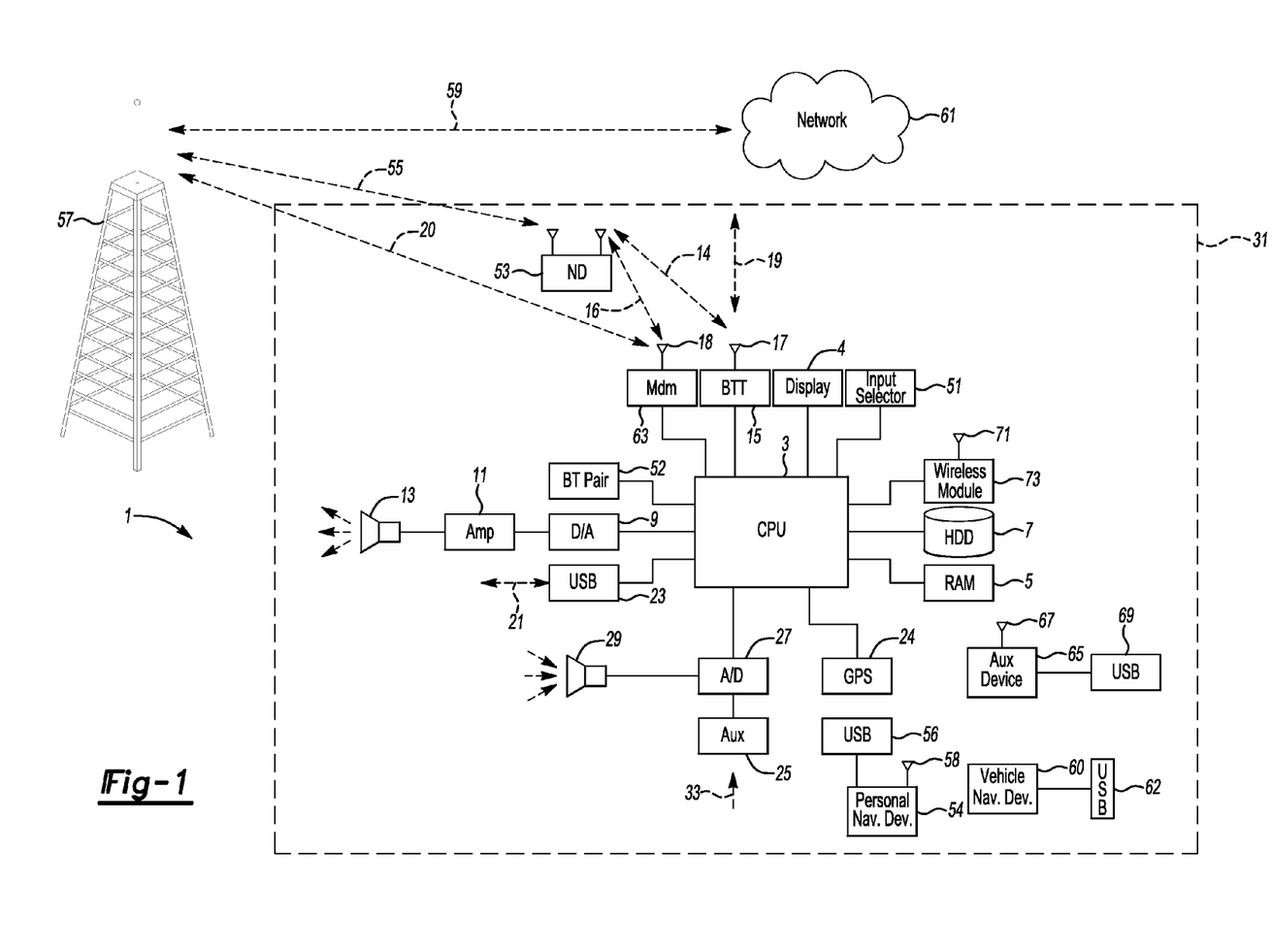
FIG. 1 shows an illustrative example of a vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having an antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connections. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply particular VACS to a given solution. In all solutions, it is contemplated that at least the vehicle computing system (VCS) located within the vehicle itself is capable of performing the exemplary processes.

There is a complex interaction between driving style, weather conditions, traffic conditions, signal light timing, accessory usage, battery temperature, topography, etc. that influences a vehicle's remaining range. While a generalized "range remaining" measurement may be taken, particulars of all these factors can greatly change this range. Even variances between levels of weather (light rain, heavy rain) can impact the range remaining in a vehicle. The impact may also be different for different drivers. Driver A may drive with a relatively linear energy consumption regardless of weather. Driver B, on the other hand, may drive significantly slower in certain weather than in other weather.

By utilizing an on-board computing system, several things can be accomplished. First, the system can interact with the driver to determine the outcome that various changes have on an energy usage profile. For example, drivers of various vehicles can be asked to change certain aspects of behavior or power usage, and then the effect on range can be measured. If a driver is asked to reduce speed by 5 mph to increase range, the vehicle can then measure what effect this has on range. Conditional variables occurring at the time may also be measured. For example, due to the likelihood and occurrences of increased braking in rainfall, a driver who reduces speed by 5 mph in rainfall may generate a different effect than a driver who decreases speed by 5 mph when the weather is pleasant. Similarly, speed changes in heavy traffic may have a different effect than speed changes in light traffic.

The driver is obviously free to ignore vehicle suggestions; however by complying with vehicle suggestions, at least two things may be achieved. The driver will add the gathered information to a database, making it easier for all vehicles to more accurately estimate how to optimize range and changes that could need to be made to driving behavior to squeeze out the few remaining miles to a charging point in a low energy situation. Additionally, the driver can add data to the driver's own driver profile. Given the variances in general driving behavior, a particular driver may benefit more or less from implementing a specific change. By complying with recommendations, the driver can build a profile that accurately reflects the specific advantages that such a change has for that driver, and may help in a later determination of whether or not the particular driver should implement a change to preserve power.

An association rule learning algorithm can be utilized to detect complex relationships between complex and highly confounded input data, and then a statistical analysis can be used to determine main effects of input data on driving range. By utilizing a vast number of possible vehicles, data can be quickly gathered and new and varying relationships between a multitude of inputs and the effects of those inputs on range can be discovered. Eventually, generalizations can be made that should be more precise in nature, and at the same time the specific applicability of those generalizations to a particular driver can be measured as well.

Figures 2A, 2B:
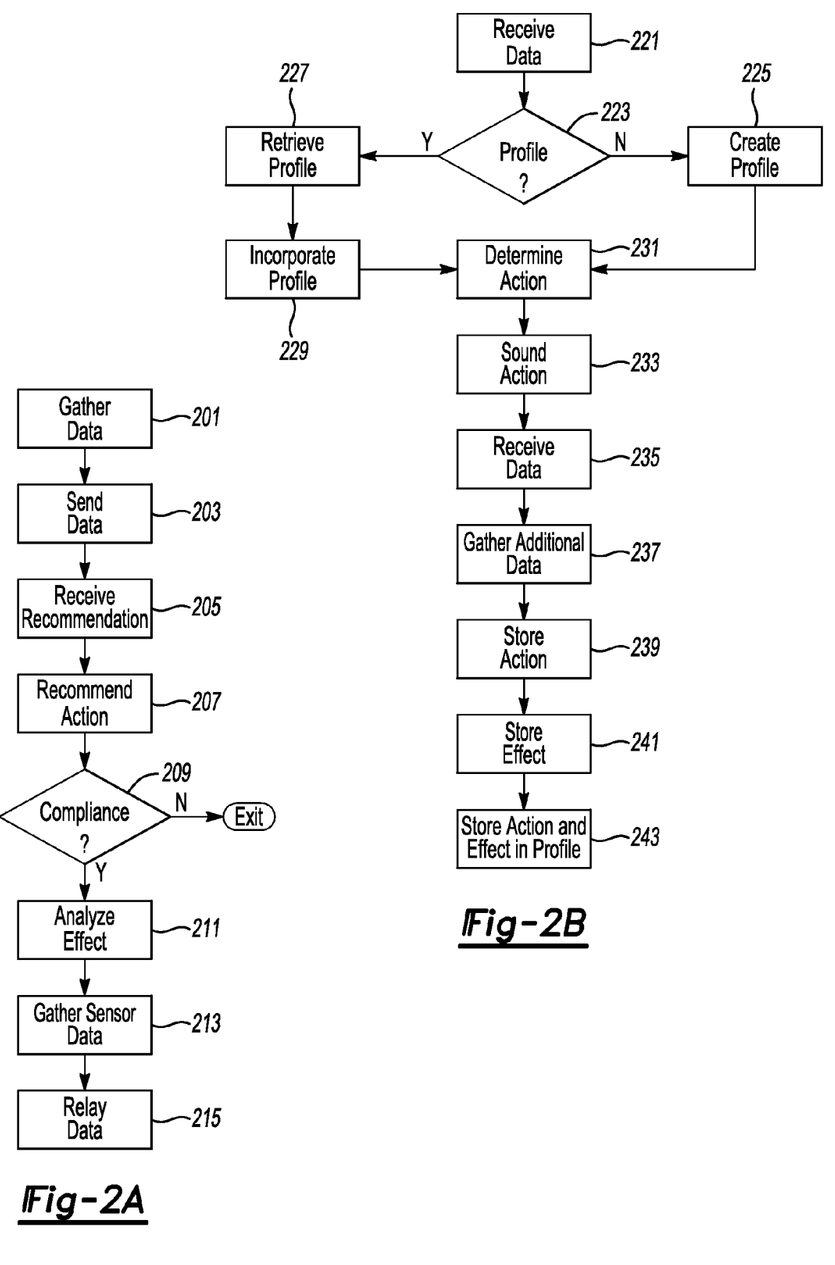
FIG. 2A shows an illustrative example of a change recommendation process.
FIG. 2B shows an illustrative example of a second change recommendation and data gathering process.

FIG. 2A shows an illustrative example of a change recommendation process. In this illustrative example, a vehicle will request efficient driving guidance from a remote or off-board system. In one instance, the guidance will be random to a degree for the particular driver, that is, the guidance will be based on a principle of energy conservation, but it may be unknown if the guidance for that specific driver will actually result in energy conservation, due to differences in driving style between, for example, previous test cases that have validated the conservational effect of the change and the specific driver to which the change is recommended.

In another example, because a driver profile may be known, or other data about a driving style may be known or observed, it may be easier to gauge or even know the likely effect of a recommended change. In this case, the change will be more specifically tailored to the driver and designed to elicit a known conservation of energy, based, for example, without limitation, on past or present observations made about that particular driver's driving style.

In this illustrative example, any desired data is gathered at the vehicle location 201. This data can include, but is not limited to, current speed, observed weather conditions, driver style data (aggressive, passive, etc., this can be determined using known techniques), location data, observed fuel/energy efficiency data, etc. The data is sent to a remote source (remote from the vehicle, in this example, although this could include an application running on a wireless device; in another example, if the vehicle had sufficient processing power and internet access, the processing could be performed on-board) for processing, and a request is included, if desired, for a recommendation as to a change in driving behavior 203.

Once the remote source completes an analysis of the data used to recommend a driving style change, the remote source will send back a recommendation which is received locally 205. The recommendation is then relayed to the driver in a suitable manner 207. In at least one instance, the recommendation may also be automatically implemented, which may or may not require driver confirmation. For example, without limitation, if a cruise control is set, and a remote process determines that a speed of 3 mph slower would result in optimal energy usage, or at least in better energy usage, the system may automatically slow the vehicle. In one example, the automatic slowing is done if the vehicle is in a low energy state, other examples may always automatically implement a change if it relates to an engaged vehicle function, or may request permission from the user before implementing the change.

In this example, the system informs the user of the recommendation 207 and then determines if the user has complied with the recommended change 209. This determination may take some period of time to complete, depending on the nature of the change. If the user has not complied, the process exits as there will not be data to gather corresponding to the change, in this example. If the user does comply (or, in some cases, even partially complies), the process will gather data relating to the effect that the change has on the vehicle systems 211. This can include, but is not limited to, fuel/energy consumption data, speed data, driving behavior data, etc. Additional sensor data, indicative of a vehicle environment, vehicle systems, etc. can also be gathered 213.

In this example, the sensor data was re-gathered at step 213 because other vehicle systems may have changed state, driving behavior may have changed, speeds may have changed, etc. Re-gathering the data, in this case, aids in analysis of the effect that the recommended change actually had on the vehicle. For example, without limitation, if an AC unit was powered down, in addition to a driver taking a recommended driving style change, the process may have to determine if the power-down of the AC resulted in more of a power efficient state, or if the change can be attributed to the change in driving behavior (at least in part). One simple method of determining this would be to subtract known efficiencies derived from powering down an AC from the total power consumption profile change and then attribute some or all of the surplus conservation to the recommended change.

Any gathered data that is reasonable and/or desirable to send to the remote system for processing can then be relayed by the on-board process 215. Although the off-board process in one example can be an application running on a wireless device in the vehicle, the device can also serve as the on-board computer for purposes of practicing certain embodiments. That is, the device performs the "on-board" functions and, if desired, a different remote system can perform the "off-board" functions. In still another embodiment, a single device (vehicle mounted or simply portable and in-vehicle) can perform both sets of functions, typically utilizing communication with one or more vehicle networks to gather needed data.

FIG. 2B shows an illustrative example of a second change recommendation and data gathering process. In this illustrative example, a remote process is shown. The process first receives data from a vehicle, including, if desired, a request for driver behavior guidance 221.

In this example, requests may be determined at least in part based on a driver profile. That is, certain known or likely efficient behavior may be considered in conjunction with the provision of a request. Additionally or alternatively, the results of any particular request may be stored with respect to a driver profile. Profiles can be created for single journeys, use over time, or can even simply be related to a vehicle itself, if the driver does not wish to have identifying information stored by a recommendation provider.

In this example, the process checks to see if a profile currently exists for a driver/vehicle/etc. 223. If there is no profile, a profile may be created 225, at least for use on a temporary basis. Of course, if the driver was opposed to profile creation, no profile need be created, and recommendations can be based solely on known efficient behavior, observed driver behavior, etc.

If there is a current profile, the process will retrieve the profile and any information already associated with that profile that may be useful in providing a recommendation 227. This information, which can include, but is not limited to, past success of actions, driving style, responsiveness, etc., can be incorporated into any determinations made by the process for recommending a particular change in behavior 229.

Once a profile has been accessed, created (or skipped), the process can then determine an action that is likely to result in an improvement in efficiency 231. In at least one example, the process will also gather data relating to the vehicle from outside sources. For example, without limitation, the process may access weather data, traffic data, etc. In one example, if the process has access to data relating to a driver, vehicle, etc. (such as, but not limited to, previous successful changes, driving style, driving/driver profile, etc.) the process can incorporate this data into the analysis of a successful change in style. The process can also consider environmental factors, driving conditions, vehicle life, current charge, etc.

Once a recommended action has been determined, the process will send the action to the vehicle (or on-board system) for processing 233. Following this step, the process can then wait to receive data relating to the success of/compliance with the recommended action. Once the data is received 235, any additional data needed or not yet gathered (such as, but not limited to, environmental, traffic, weather, driving profile, etc.) can be obtained 237 and the results of the action can be stored 239.

Storing the results of the action can take several forms. The process can determine the relative success of the action for a generic driver, for the specific driver, for a driver fitting a profile of the driver, for any of the preceding given the current conditions, etc. The action itself can be stored (or data can be stored within a category previously designated for that action). In addition, any data relating to effects that resulted from the recommended action can be stored 241. Again, this can be stored, if desired, with respect to a category that includes the action. Data from a specific driver following a recommendation can also be normalized with data from numerous other drivers, in the same or similar situations, also following the same recommended action. In this manner, a general sense of the effectiveness of a particular change can be determined.

In addition to storing the data generally, the data can be stored with respect to a specific driver profile 243. This profile can relate to the driver directly, a vehicle, etc, Further, the profile can be temporary, permanent, etc. as desired by a service provider, and/or as requested by a driver/user.

Figure 3A:
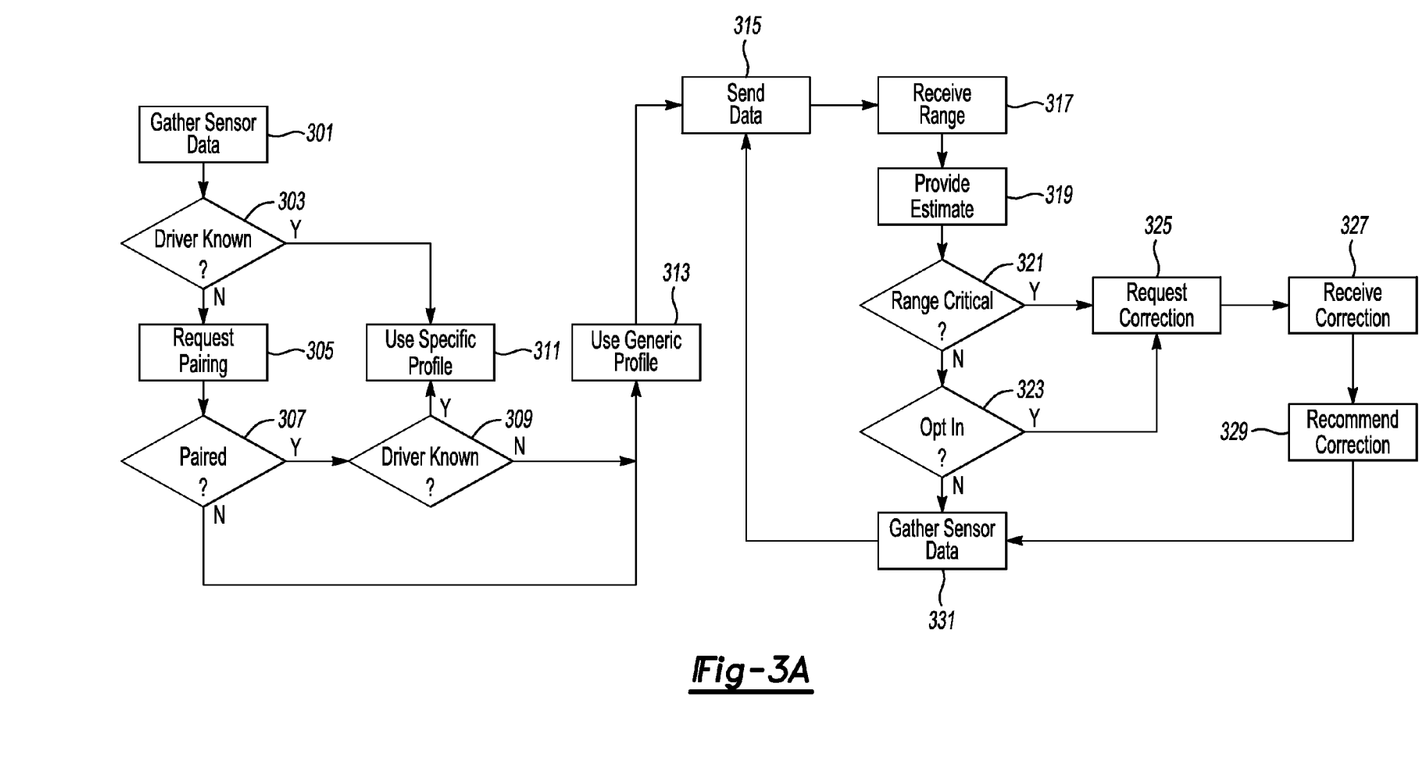
FIG. 3A shows an illustrative example of an energy usage guidance process.

FIG. 3A shows an illustrative example of an energy usage guidance process. In this illustrative example, an on-board process begins by gathering sensor data 301. As previously noted, the on-board process can be run in a vehicle computing system, on a wireless device in communication with a vehicle network and/or vehicle computing system, etc. In this illustrative embodiment, at least some aspect of a driver profile may be stored locally. This could be a comprehensive profile, detailing, among other things, results of previous driving adjustments, or it could be as simple as a driver name.

If the driver is known 303, the process will access a specific profile for that driver 311. In at least one embodiment, a driver is identified based on a paired phone$_{[prm1]}$ (e.g., without limitation the BLUETOOTH MAC address, phone number, ESN, MIN, CPU number, etc). In other examples, the driver may be identified by bio-metrics, visual recognition sensors, voice recognition sensors, etc.

If no "known" driver is present, the process may ask for the driver to pair a wireless phone$_{[prm2]}$ or other device to aid in identification of the driver 305. Pairing the device may result in data identifying the driver being available, including, but not limited to, a driver mobile number, driver data stored on a wireless device, etc. If the device is paired 307, the process checks to see if the user is known 309. If the user is unknown, an option may be given to create a profile. If the user is unknown and/or does not wish to create a profile, the process proceeds with a generic profile. The generic profile may be stored with respect to the vehicle, and may be stored solely for the duration of the drive, or for any desired period of time. Once the profile has been selected (if desired), the process sends relevant data to a remote source for processing of an energy efficiency calculation and/or a calculation of remaining vehicle range 315.

In this illustrative embodiment, in addition to receiving energy consumption advice from a remote source, the process may also receive data relating to a vehicle range. Due to a variety of factors that may impact a vehicle range, many of which may not be readily available to an on-board system, in at least one embodiment the range calculation will be done off-board, in a source that can access remote data sources such as, but not limited to, traffic data, weather data, past driving history, past range history, etc. Once a range has been calculated, the estimated range is delivered to the vehicle 317 and provided for a driver 319.

In at least some instances, the range may be "critical," that is, there may be some possibility that a driver will not reach an intended destination with the current level of power consumption. If the range is critical 321, in this embodiment, the process requests advice on driving behavior from a remote process 325. Responsively, the remote process provides at least one recommended behavioral change 327 and the vehicle relays the recommended behavioral change to the driver 329 for implementation. If the driver has so elected, and the change can be processed automatically, the process may automatically implement the change (e.g., without limitation, slowing the vehicle, powering down un-needed systems, etc.).

In this embodiment, even if the energy/fuel level is not at a critical point 321, the process may check to see if a driver has "opted in" to receive recommendations on driving behavior 323. Some drivers may prefer not to receive advice on driving, instead preferring to drive as they see fit. Other drivers, such as energy conscious drivers or those wishing to preserve power may elect to be notified when a change in driving behavior could result in a more optimal fuel consumption state. In such instances, the drivers will also receive possible corrections in driving behavior from the remote process.

Once a change has been recommended and implemented, the process can gather 331 and report sensor data in the next data-send 315.

Figure 3B:
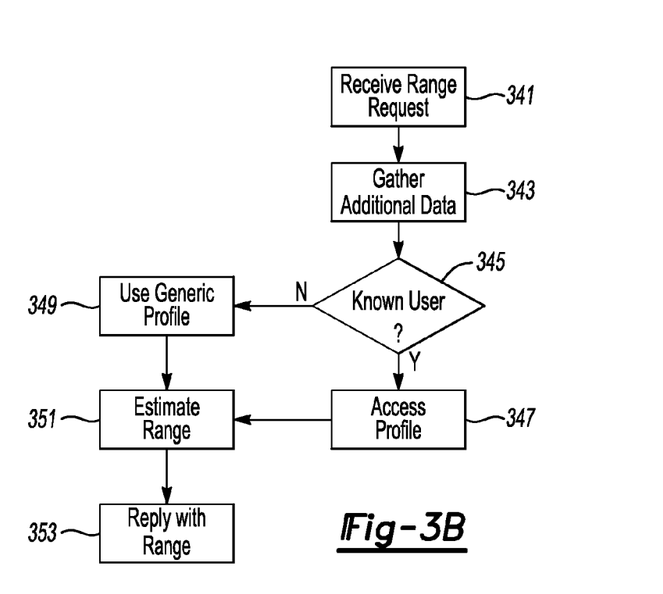
FIG. 3B shows an illustrative example of a range determination process.

FIG. 3B shows an illustrative example of a range determination process. In this illustrative example, the process is a process remote from the vehicle computing system, and capable of communication with a vehicle computing system or other on-board system executing a driving behavior recommendation process. In this example, the process first receives a range request 341.

As with the example discussed with respect to FIG. 3A, this process will calculate a vehicle range off-board from the vehicle. Since, in this example, the process has access to additional data (such as, but not limited to, traffic, weather, road topography, construction data, etc.) the process may be better capable than a vehicle system of estimating a remaining range. The process gathers any additionally desired data 343 and checks to see if a vehicle is being driven by a known user 345. If the user is known 345, the process can access a profile for the user 347.

The user profile can contain data including, but not limited to, past observations on how a vehicle performed efficiency-wise under conditions similar to those existing in a present instance of range request. The data can also contain information on driver behavior and how a particular driver uses energy. If a user is not known, a generic profile 349 may be used. The generic profile may be, for example, without limitation, a profile for a vehicle make and model, and the profile may know how a similarly configured vehicle, running similar power drains, will perform energy-wise under similar conditions.

Regardless of which profile is used, the process can estimate a remaining range 351 and reply to a vehicle system/process with the estimated range 353.

Figure 3C:
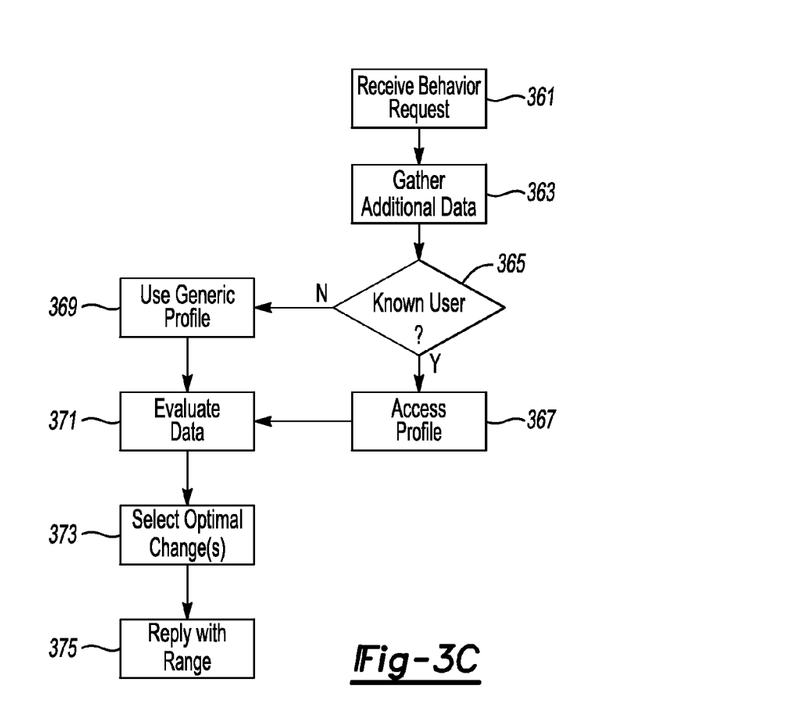
FIG. 3C shows an illustrative example of an energy optimization recommendation process.

FIG. 3C shows an illustrative example of an energy optimization recommendation process. Similar to FIG. 3B, this off-board process will attempt to evaluate the present behavior of the driver and determine if any changes may result in optimization of energy or fuel usage. In this example, the process receives a request for behavioral modification suggestion, along with any relevant data sent by a vehicle system/process 361.

Again, the process may also seek out and gather additional data that could be relevant to a determination of efficiency, such as data that can be used to see how similar vehicles/drivers, or this specific vehicle/driver, performed under similar conditions in the past 363. As with the process in FIG. 3B, this process also checks to see if a driver identity is known 365. If the driver is known, more specific information about the actual effects of certain changes to driving behavior may be known, and the process may access a driver profile to obtain this information 367. A driver profile can also be used to compare the driver to a "class" of drivers having similar characteristics, in the event that the effects of a specific change are not known.

If a driver is unknown, a generic profile may again be used 369, which may correspond, for example, to a driver style, a vehicle make and/or model, etc. and track performance of similar drivers/vehicles under similar conditions implementing various changes to driving behavior. Once a profile has been selected, the process begins to evaluate the data needed to determine what sort of change in driving behavior may result in better fuel/energy efficiency 371. One or more optimal changes/suggestions are selected, based on the evaluation process, and the recommended changes to driving behavior are relayed to the on-board system/process for presentation to a driver.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:
receiving a request for improving vehicular energy conservation;
based on received vehicle data and stored data, including a current estimated remaining range and energy consumption rate, indicating how a proposed action should impact vehicle range, determining an appropriate action for improved conservation, via a computer;
providing the determined action to a vehicle computing system;
receiving data indicating a change in vehicle energy efficiency resulting from implementation of the action, including indicia that the action was implemented;
analyzing the data indicating a change in vehicle energy efficiency to determine the effectiveness of the action; and
updating the stored data indicating how a proposed action should impact vehicle range based on the analyzing.

2. The method of claim 1, wherein the vehicle data includes a current speed.

3. The method of claim 1, wherein the vehicle data includes accessory usage.

4. The method of claim 1, wherein the providing the determined action is further based on additionally available data retrieved from a source remote from a vehicle.

5. The method of claim 4, wherein the additionally available data includes weather data.

6. The method of claim 4, wherein the additionally available data includes traffic data.

7. The method of claim 1, wherein the action includes recommending a change in driving behavior.

8. The method of claim 1, wherein the action includes recommending a change in accessory usage.

9. A non-transitory machine readable storage medium storing instructions that, when executed by a processor, cause the processor to perform the method comprising:
receiving a request for improving vehicular energy conservation;
based on received vehicle data, including a current estimated remaining range and energy consumption rate, and stored data indicating how a proposed action should impact vehicle range, determining an appropriate action for improved conservation;

providing the determined action to a vehicle computing system;

receiving data indicating a change in vehicle energy efficiency resulting from implementation of the action, including indicia that the action was implemented;

analyzing the data indicating a change in vehicle energy efficiency to determine the effectiveness of the action; and updating the stored data indicating how a proposed action should impact vehicle range based on the analyzing.

10. The non-transitory machine readable storage medium of claim 9, wherein the vehicle data includes a current speed.

11. The non-transitory machine readable storage medium of claim 9, wherein the vehicle data includes accessory usage.

12. The non-transitory machine readable storage medium of claim 9, wherein the providing the determined action is further based on additionally available data retrieved from a source remote from a vehicle.

13. The non-transitory machine readable storage medium of claim 12, wherein the additionally available data includes weather data.

14. The non-transitory machine readable storage medium of claim 12, wherein the additionally available data includes traffic data.

15. The non-transitory machine readable storage medium of claim 9, wherein the action includes recommending a change in driving behavior.

16. The non-transitory machine readable storage medium of claim 9, wherein the action includes recommending a change in accessory usage.

17. A computer-implemented method comprising:

receiving a request for improving vehicular energy conservation;

receiving driver identity;

receiving vehicle data, including estimated remaining-range and energy-consumption-rate;

based on received vehicle data and driver identity, determining an action, via a computer, as being effective at energy conservation for the driver under similar conditions that are recognizable from the received vehicle data and that are stored with respect to a driver profile; and providing the determined action to a vehicle.

* * * * *